United States Patent [19]

Petershofer

[11] Patent Number: 4,756,863
[45] Date of Patent: Jul. 12, 1988

[54] METHOD FOR HOT-FORMING A LAMINATED SHEET OF SYNTHETIC RESIN AND A DEVICE FOR WORKING THIS METHOD

[75] Inventor: Georg Petershofer, Wiener Neudorf, Austria

[73] Assignee: Isovolta Osterreichische Isolierstoffwerke, Wiener Neudorf, Austria

[21] Appl. No.: 881,040
[22] PCT Filed: Oct. 14, 1985
[86] PCT No.: PCT/AT85/00039
  § 371 Date: Jun. 10, 1986
  § 102(e) Date: Jun. 10, 1986
[87] PCT Pub. No.: WO86/02314
  PCT Pub. Date: Apr. 24, 1986

[30] Foreign Application Priority Data
Oct. 12, 1984 [AT] Austria .................. 3249/84

[51] Int. Cl.$^4$ .............. B29G 53/04; B21D 11/00; B21D 11/22
[52] U.S. Cl. .................. 264/322; 264/295; 264/339; 425/374; 425/397; 72/319; 156/222
[58] Field of Search .......... 264/339, 295, 322; 425/374, 394, 397; 72/312, 313, 319, 320; 156/221, 222

[56] References Cited

U.S. PATENT DOCUMENTS

| | | | |
|---|---|---|---|
| 2,937,689 | 5/1960 | Peterson | 156/492 |
| 3,009,201 | 11/1961 | Hansen | 425/374 |
| 4,002,049 | 1/1977 | Randolph, Sr. | 72/313 |
| 4,045,269 | 8/1977 | Voss et al. | 156/221 |
| 4,350,551 | 9/1982 | Michaelson | 264/322 |

FOREIGN PATENT DOCUMENTS

| | | |
|---|---|---|
| 2823669 | 1/1979 | Fed. Rep. of Germany . |
| 1388710 | 3/1975 | United Kingdom . |
| 2071541 | 9/1981 | United Kingdom . |

*Primary Examiner*—Jan H. Silbaugh
*Assistant Examiner*—Neil Michael McCarthy
*Attorney, Agent, or Firm*—Bierman and Muserlian

[57] ABSTRACT

An apparatus and a method for hot-forming a laminated sheet of synthetic resin. The sheet, in at least its region that is to be deformed, is heated to the forming temperature which is equal to or higher than the melting temperature of a thermoplastic bonding agent which is disposed between the laminate layers containing a duromer plastic material and planar carrier materials. The sheet is bent around a cylindrical surface with the aid of a movably guided bending plate, and is cooled. During a large part of the bending operation, the bending plate will be in planar contact with the border region of the sheet. The individual laminate layers will be mutually displaced in the bending region and in the border region in the direction of the sheet's surface, and after the bending operation, the bending plate holds the border region in its bent position at least until the resolidification of the thermoplastic bonding agent. In a last phase of the bending operation, the bending plate (12) is constantly guided in such a manner that each point of its bending surface (16) has an essential component of motion in a direction parallel to the plane of the bent border region (31''). A prebending element is provided connected with the bending plate (12), and during a first phase of the bending operation, the prebending element presses against the border region (31) of the sheet to be bent and thereby prebends it.

13 Claims, 4 Drawing Sheets

METHOD FOR HOT-FORMING A LAMINATED SHEET OF SYNTHETIC RESIN AND A DEVICE FOR WORKING THIS METHOD

TECHNICAL DOMAIN

The invention relates to a method for hot-forming a laminated sheet of synthetic resin composed of several hot-forming laminate layers containing a duromer plastic material and planar carrier materials, between which are inserted layers of a thermoplastic bonding agent, by which method the sheet in at least its region that is to be deformed is heated to the forming temperature which is equal to or higher than the melting temperature of the thermoplastic bonding agent, and whereupon, for the purpose of bending a border region of the sheet that in its final form is flat, it is bent around a cylindrical surface with the aid of a movably guided bending plate, and is cooled, in such a manner that at least during a large part of the bending operation the bending plate will be in planar contact with the border region of the sheet that is to be bent, and the individual laminate layers are mutually displaced in the bending region and in the border region in the direction of the sheet's surface, and whereat, after the bending operation, the bending plate holds the border region in its bent position at least until the resolidification of the thermoplastic bonding agent. In addition, the invention relates to a device for working the method according to the invention.

STATE OF THE ART

Laminated sheets of synthetic resin of the kind described above, as well as methods for hot-forming such sheets are known from German Pat. No. 28 23 669. In this known method, the bending plate executes during the bending operation a rotary motion around an axis that coincides with the axis of the cylindrical surface around which the sheet is being bent, with the bending plate performing a sliding motion relative to the surface of the border region of the sheet that is to be bent, and with which it is in constant planar contact. The frictional forces acting during this sliding motion on the surface of the border range of the sheet that is to be bent counteract a tendency of the sheet to split in the bending region along the bonding agent seams, as the applicant found out later. This splitting is also counteracted in the aforementioned known methods by form-holding parts which after the bending operation hold the bending region or the border region, respectively, in its bent or deformed form, at least until the resolidification of the bonding agent. As a form-holding agent, e.g., a strip-shaped press die with a concave cylindrical pressure surface may be used, which after the bending operation is pressed against the convex surface of the bent sheet region.

Experience has shown that in the aforementioned known methods the pressure surface of the form-holding parts must very precisely match the sheet surface that has a convex bend in the bending region.

With greater thickness tolerances of the sheet, the risk obtains that in the event of a greater thickness deviation upwards, the edges of the pressure surface of the form-holding part will press against the sheet surface in an undesirable manner. In addition, a separate form-holding part is required for each bending radius and each sheet thickness.

DESCRIPTION OF THE INVENTION

It is the object of the invention to indicate a method of the kind mentioned above for the hot-forming of laminated sheets of synthetic resin, which are composed of several hot-forming laminate layers containing a duromer plastic and planar carrier materials, between which are inserted layers of a thermoplastic bonding agent, with the method of the invention making do without the use of special form parts matching the convexly curved.

The problems of the prior art solved by the method of the present invention wherein in the last phase to the invention that is characterized by that in a last phase of the bending operation the bending plate is constantly guided in such a manner that each point of its bending surface has an essential component of motion in a direction parallel to the plane of the bent border region, and that, appropriately, a prebending element is provided connected with the bending plate, which in its motion during a first phase of the bending operation presses against the border region of the sheet to be bent and thereby prebends it.

By guiding the bending plate according to the method of the invention, a substantial sliding motion between the bending plate and the sheet's border region to be bent obtains also shortly before the end position of the bending plate is reached, whereby the frictional forces transferred to the outer laminate layer of the sheet such a great traction in the direction of the sliding motion acts on this laminate layer that it surely prevents a splitting of the sheet along the bonding agent seams. In the bending plate's end position, it presses the bent border region of the sheet against a counterpressure surface, whereby the bending region and the bent border region of the sheet are fixed in the final form until the resolidification of the thermoplastic bonding agent.

According to a preferred embodiment of the invention, the method of the invention is characterized by that the motion executed by the bending plate in a last portion of the bending operation is a rotary motion. During this rotary motion of the bending plate, an angle of rotation between 15° and 45° is advantageously covered.

In a further preferred embodiment of the invention, the method of the invention is also characterized by that during an initial phase of this rotary motion, a translational motion is superimposed on it in an at least nearly parallel direction to the plane of the bent border region of the sheet.

According to a further preferred embodiment of the invention, the method of the invention is additionally characterized by that during the bending of the border region of the sheet by about 90°, this rotary motion takes place at least during a final period of this rotary motion around an axis of rotation the distance of which from the plane of that surface of the undeformed region of the sheet that changes over into the convex surface of the bent sheet region is smaller than half the distance of this plane from the bending surface axis, and the distance of which from the plane of the outer surface of the bent border region of the sheet is greater than double the distance of this plane from the bending surface axis.

According to another preferred embodiment of the invention, the method of the invention is characterized by that the prebending element performs a translational motion during its engagement with the bent border region of the sheet in an at least nearly parallel direction to the plane of the bent border region of the sheet.

It is a further object of the invention to indicate a device for bending sheets, which has a clamping device with flat clamping surfaces for holding the undeformed sheet, as well as a bending template and a counterpressure surface, whereby one of the flat clamping surfaces changes over into the counterpressure surface that is bent against this clamping surface, by way of the appropriately circular-cylindrical bending surface, and which has a bending plate that is pivoted on a mounting, with a pressure surface and with an adjusting element, with said device to be particularly suited to carrying out the method according to the invention.

This problem is solved by the device according to the invention, which is characterized by a cradle or sliding carriage adjustable in the direction that is at least nearly parallel to the counterpressure surface, in which cradle or sliding carriage the bending plate mounting is pivoted, by one or more adjusting elements to adjust the cradle or sliding carriage, and appropriately by a special pressure mechanism for pressing the bending plate against the flat, bent border region of the sheet. On the bending plate or on its mounting, a prebending element appropriately shaped as a cylindrical body is attached or supported.

In a preferred embodiment of the device according to the invention, it is characterized by that the adjusting element for the bending plate is formed by a hydraulic adjusting device engaging the bending plate or its mounting, which forces on the bending plate a translational and/or rotary motion against the resistance of the border region of the sheet that is to be bent. Advantageously, a stop is provided to limit the translational motion of the cradle or sliding carriage, which is actuated even before the end of the rotary motion.

According to a further embodiment, the device according to the invention serving to bend a border region of a sheet by 90° and which is provided with a clamping element with clamping surfaces that are displaceable in a direction at least approximately parallel to the counterpressure surface, is characterized by that the hydraulic adjusting mechanism engaging at the bending plate or its mounting is supported by the displaceable clamping element.

According to a preferred embodiment of the device of the invention, the prebending element is formed by one or several rollers or cylinders pivoted on the bending plate or its mounting, and/or the plane of the pressure surface of the bending plate cuts the body or bodies of the prebending element.

DESCRIPTION OF THE DRAWINGS IN CONNECTION WITH AN EMBODIMENT OF THE INVENTION

Figure 1:
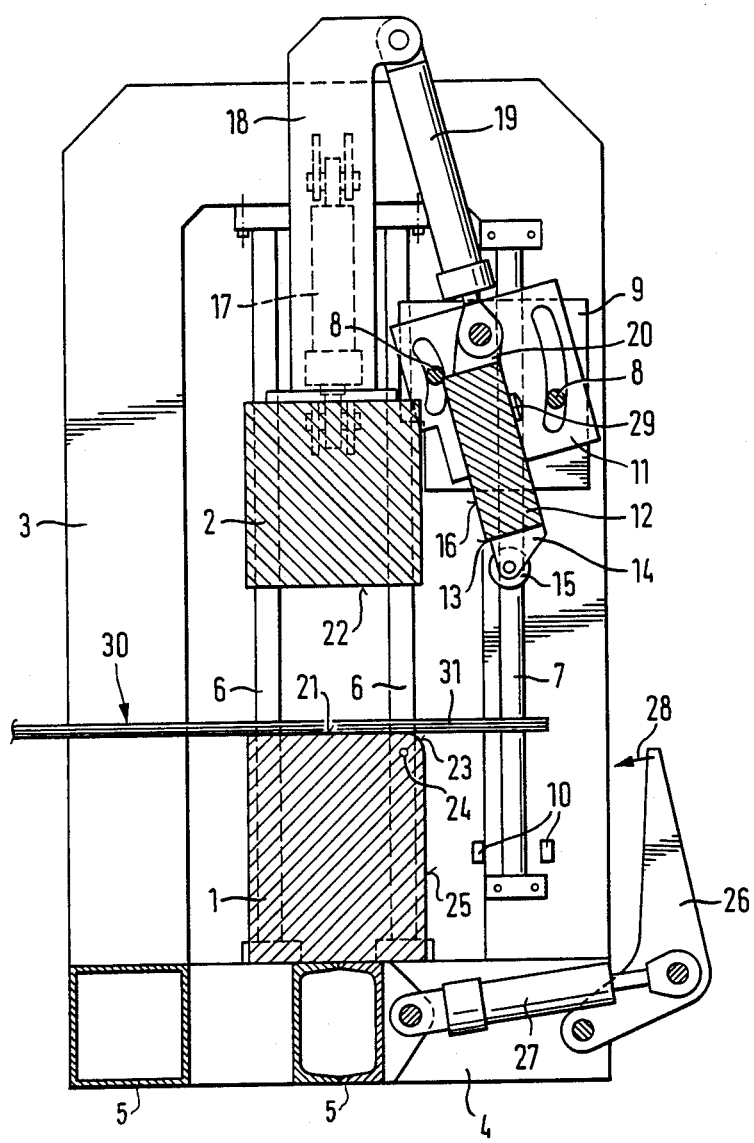
FIG. 1 shows an advantageous realization of the device of the invention for carrying out the method according to the invention in schematic section.

This device, shown in FIG. 1 in its rest position, is constructed substantially symmetrically to the plane of the drawing. It shows a clamping mechanism in the nature of a down stroke press, with two clamping bars 1 and 2, the longitudinal extension which runs vertically to the plane of the drawing. The lower clamping bar 1 is mounted in a bedplate which essentially consists of two frames 3 arranged at both ends of clamping bars 1, 2, which frames are connected to each other by a base grate 4 with side bars 5. At each of the two frames 3, two guide columns 6 are arranged to guide the upper, vertically adjustable clamping bar 2, and guide column 7 to guide a base plate 9 provided with blocks 8, with the vertical motion of said base plate downwards being defined by stops 10.

Guide plates 11 are pivoted on the blocks 8 of the base plates 9. The two guide plates 11 are connected by a beam-shaped bending plate 12 whose longitudinal extension runs vertically to the plane of the drawing. In the vicinity of the lower longitudinal edge 13 of the bending plate, rollers 15 serving as prebending element are pivoted on several base supports 14 arranged along the bending plate 12, in such a manner that the roller surfaces will project somewhat beyond the plane of the bending plate pressure surface 16, which means that the plane of this pressure surface 16 cuts through the bodies of these rollers 15.

Two hydraulic adjusting devices 17 acting between the two frames 3 and the upper clamping bar 2 serve to move the upper clamping bar 2. In addition, two uprights 18 are mounted on the upper side of the upper clamping bar, which at their upper ends are pivoted on one end of the hydraulic adjusting devices 19, while the other ends of these adjusting devices 19 are pivoted on base supports 20 which are connected to the bending plate 12.

The clamping bars 1, 2 have flat clamping surfaces 21, 22, with the clamping surface 21 of the lower clamping bar 1 changing over, through a circular cylindrical bending surface 23 whose axis is indicated with 24, into a counterpressure surface 25 which is bent by 90° in relation to this clamping surface 21. The clamping surfaces 21, 22, the bending surface 23 and the counterpressure surface 25 are cooled with the aid of a cooling medium which circulates in suitable cooling channels arranged in clamping bars 1, 2, which are not shown in the figures for reasons of better clarity.

In addition, the device contains a pressure mechanism consisting of two pressure levers 26 pivoted on the base grate 4, which, with the aid of hydraulic adjusting mechanisms 27 acting between the base grate 4 and the pressure levers 26, can be moved from the rest position shown in FIG. 1 in the direction of arrow 28 and which are intended to work together with the stops 29 arranged at the back of bending plate 12.

Figure 2:
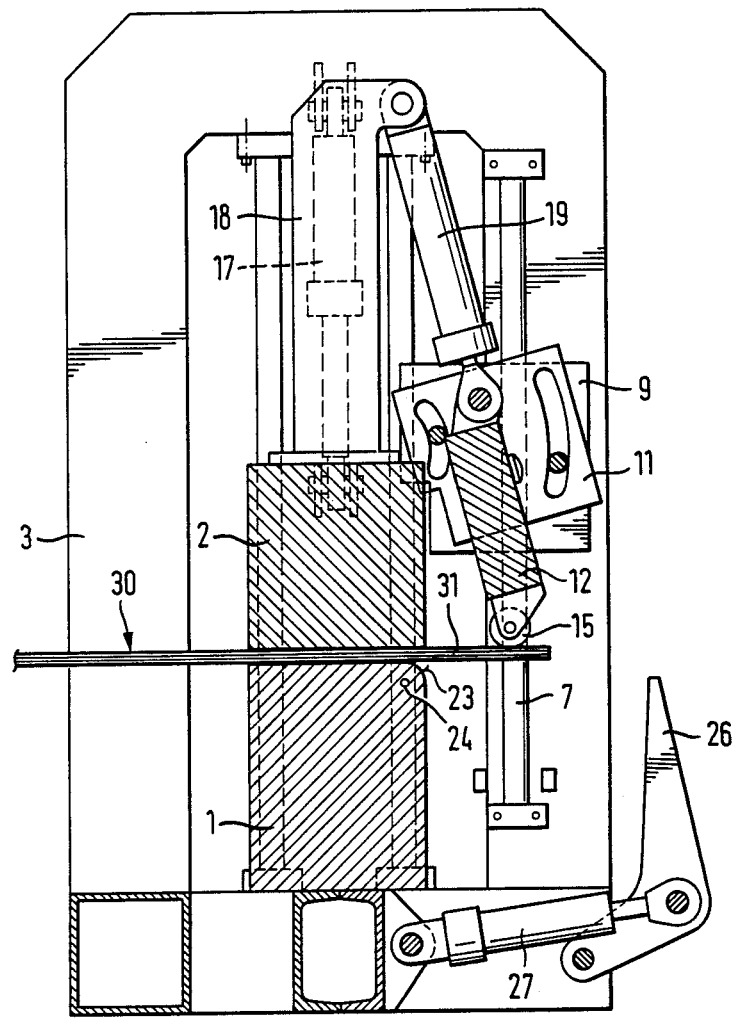
FIGS. 2 through 4 show this device in three different phases of the method of the invention for hot-forming a laminated sheet of synthetic resin.

To carry out the method for bending the border region of a laminated sheet of synthetic resin, as described in German Pat. No. 28 23 669, the sheet 30 is first heated in a separate device to the forming temperature of about 160°-170° C. and then placed on the clamping surface 21 of the lower clamping bar 1 in such a manner that—as can be seen in FIG. 1—it will protrude with its border region 31 that is to be bent beyond the edge of the clamping bar 1. By actuating the hydraulic adjusting mechanisms 17, the upper clamping bar 2 is lowered and the sheet 30 is wedged between the two clamping bars 1, 2 (see FIG. 2). Together with the upper clamping bar 2, there is also lowered the unit connected with it by way of the brackets 18 and the hydraulic adjustment mechanisms 19, and consisting of the base plates 9, guide plates 11, the bending plate 12 and the rollers 15, and which unit is vertically displaceable along the guide columns 7, in such a manner that in the phase of the method of the invention shown in FIG. 2, the rollers 15 serving as prebending element contact the sheet's border region 31 that is to be bent.

Figure 3:
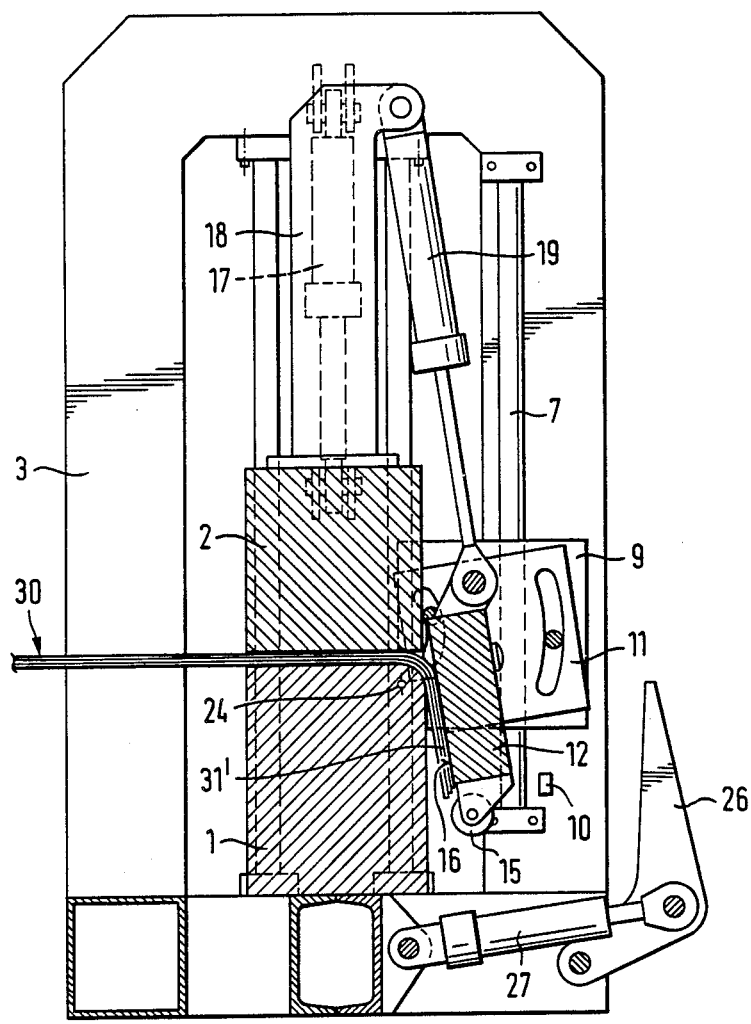

Subsequently, the hydraulic adjustment mechanisms 19 are actuated, as a result of which the bending plate 12 together with the base plates 9 guided along the guide columns 7 and the rollers 15 that are connected to the bending plate 12 is lowered further and the rollers 15 then prebend the sheet 30 over the circular cylindrical bending surface 23, the radius of which is, e.g., 30 mm, whereat the rollers 15 roll off along the sheet surface, until the bending plate pressure surface 16 thereupon comes into contact with the prebent border region 31' of the sheet (see FIG. 3). In the course of the further thrust of the hydraulic adjustment mechanisms 19, this bending plate pressure surface 16 adjoins the border region 31 of the sheet under pressure, and slides along the surface of the border region and—by virtue of the sliding friction—there applies on the upper laminate layer of the sheet a force in the direction towards the edge of the sheet, whereby a splitting of the sheet along the bonding agent seams is prevented.

Upon establishment of the planar contact between the pressure surface of the bending plate and the prebent border region 31' of the sheet, a rotary motion is superimposed on the translational motion of the bending plate 12, whereat the relation between translational and rotary motion results quite automatically from that the pressure area 16 of the bending plate is in constant planar contact with the sheet's border region that is to be bent. FIG. 3 shows the position of the device during this phase of the bending operation.

During the further thrust of the adjustment mechanisms 19, the vertical translational motion of the bending plate 12 is initially stopped by virtue of the base plates 9, on which the bending plate 12 is pivoted, run up against the stops 10 and the further thrust of the adjustment mechanisms 19 then serves exclusively to continuing the rotary motion of the bending plate 12.

In this last phase of the bending operation, the bending plate thus executes a purely rotary motion around an axis 32 (see FIG. 4) which lies approximately in that surface of the undeformed region of the sheet, which changes over into the convex surface of the bent region of the sheet and whose distance from the plane of the outer surface of the bent border region of the sheet is greater than the distance of this plane from the bending surface axis 24. From this it results that also in this last phase of the bending operation, each point of the pressure surface 16 of the bending plate, in particular also just before the bending plate comes to a halt at the end of the bending operation, has an essential motion component in the direction parallel to the plane of the bent border region 31" (see FIG. 4), which means that also immediately before the end of the bending operation, the pressure surface 16 of the bending plate and the surface of the prebent border region 31' of the sheet slide towards each other and by virtue of the forces acting on the uppermost laminate layer in the direction of the laminate surface by virtue of the sliding friction prevent a splitting of the sheet at its bonding agent seams.

Figure 4:
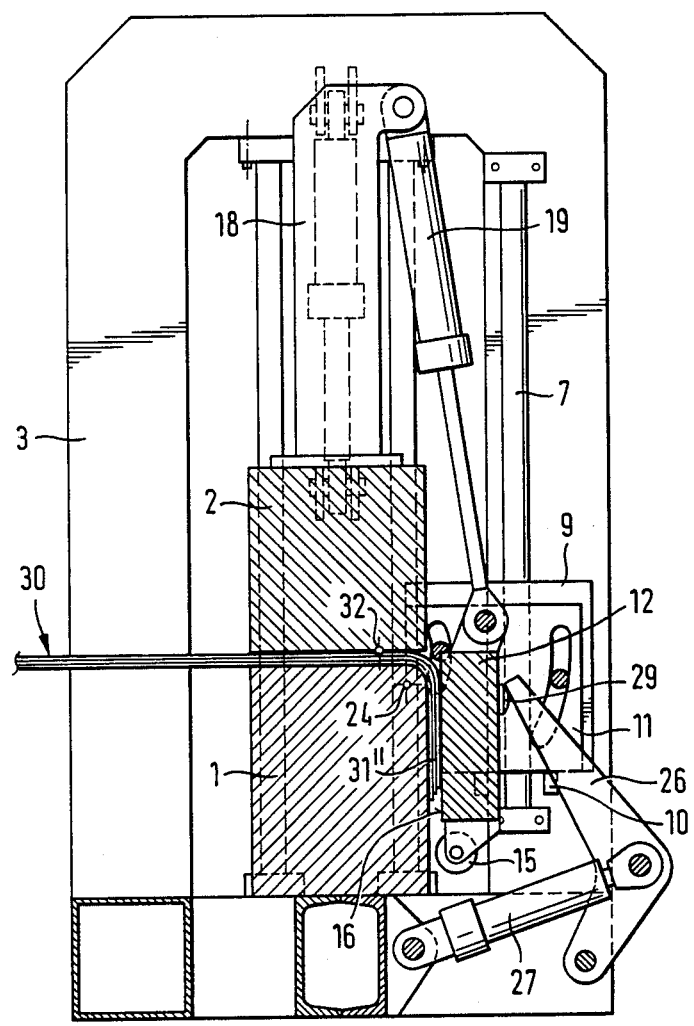

To support the momentum of the rotary motion of the bending plate 12 during this last phase of the bending operation 9, the hydraulic adjusting mechanisms 27 are actuated immediately after the base plates 9 run up against the stops 10, pressing the pressure levers 26 against the stops 29 mounted on the rear side of the bending plate 12 and pressing the bending plate 12—after ending its rotary motion during a resolidifcation period for the bonding agent seams—to the bent border region 31" of the sheet (see FIG. 4).

Depending on the thickness of the sheet to be bent, the bending operation lasts between 5 and 15 seconds, the resolidification period between 4 and 6 minutes.

Commercial Usability

The bent laminated sheets of synthetic resin produced with the aid of the method of the invention as well as with the device according to the invention are used above all as self-supporting sheet parts provided with decorative surfaces, mainly for furniture and the inside finishing and panelling of rooms, especially for hospitals, plumbing units, and sanitary cabins.

I claim:

1. Device for bending a border region of a sheet by about 90°, which has a clamping device with flat clamping surfaces serving to hold the undeformed sheet, with one of the clamping surfaces changing over into a counterpressure surface by way of an appropriately circular-cylindrical bending surface, and which also has a bending plate that is pivoted on a mounting for rotation around an axis parallel to the axis of the cylindrical bending surface and has a plane pressure surface and an adjusting mechanism, characterized by a cradle or ing the method of claim 1, characterized by a cradle or sliding carriage adjustable by one or more adjusting mechanisms, in the direction that is at least nearly parallel to the counterpressure surface (25), in which cradle or sliding carriage the bending plate mounting is pivoted, so that in an end position of the cradle or sliding carriage the distance of the axis of rotation of the bending plate from the plane of that surface of the undeformed region of the sheet that changes over into the convex surface of the bent sheet region is smaller than half the distance of this plane from the bending surface axis, while the distance from this axis of rotation from the plane of the outer surface of the bent border region of the sheet is greater than the distance of this plane from the bending surface axis, by one or more adjusting mechanisms to adjust the cradle or sliding carriage, and a special pressure mechanism for pressing the bending plate (12) against the bent border region of the sheet.

2. Device according to claim 7, characterized by that on the bending plate (12) or on its mounting a prebending element appropriately shaped as a cylindrical body is attached or supported.

3. Device according to claim 1, characterized by that the adjusting mechanism for the bending plate (12) is formed by a hydraulic adjusting mechanism (19) engaging the bending plate (12) or its mounting, which mechanism forces a translational and/or rotary motion on the bending plate (12) against the border region (31) of the sheet to be bent.

4. A device of claim 3 with a clamping element having one of the clamping surfaces that is displaceable in a direction at least approximately parallel to the counterpressure surface, characterized by a hydraulic adjusting mechanism (19) which is engaged at the bending plate (12) on a mounting and is supported by the displaceable clamping element.

5. Device according to claim 3, characterized by a stop (10) for delimiting the translational motion of the cradle or slidable carriage, which translational motion of the cradle is terminated prior to the end of the rotary motion.

6. Device according to claim 2, characterized by that the prebending element is formed by one or several rollers or cylinders (15) pivoted on the bending plate (12) or its mounting.

7. Device according to claim 6, characterized by that the plane of the pressure surface (16) of the bending plate (12) cuts the body or bodies of the prebending element.

8. Method for hot-forming a laminated sheet of synthetic resin which is composed of several hot-forming laminate layers containing a duromer plastic material and planar carrier materials, between which are inserted layers of a thermoplastic bonding agent, by which method the sheet in at least its region that is to be deformed is heated to the forming temperature which is equal to or higher than the melting temperature of the thermoplastic bonding agent, and whereupon, for the purpose of bending a border region of the sheet that in its final form is flat, the sheet is bent around a cylindrical surface with the aid of a movably guided bending plate, and is cooled; the bending occurring in such a manner that at least during a large part of the bending operation the bending plate will be in planar contact with the border region of the sheet that is to be bent, and the individual laminate layers will be mutually displaced in the bending region and in the border region in the direction of the sheet's surface, and whereat, after the bending operation, the bending plate holds the border region in its bent position at least until the resolidification of the thermoplastic bonding agent, and the bending characterized by that in a last phase of the bending operation the bending plate (12) is constantly guided in such a manner that each point of its bending surface (16) has an essential component of motion in a direction parallel to the plane of the bent border region (31"), and that, appropriately, a prebending element is provided connected with the bending plate (12), which in its motion during a first phase of the bending operation presses against the border region (31) of the sheet to be bent and thereby prebends it.

9. Method according to claim 8, characterized by that the motion executed by the bending plate (12) in a last portion of the bending operation is a rotary motion.

10. Method according to claim 9, characterized by that during the rotary motion of the bending plate (12), an angle of rotation between 15° and 45° is covered.

11. Method according to claim 9, characterized by that during an initial phase of this rotary motion, a translational motion is superimposed on it in an at least nearly parallel direction to the plane of the bent border region (31") of the sheet.

12. Method according to claim 9, characterized by that during the bending of the border region (31) of the sheet by about 90°, this rotary motion takes place at least during a final period of this rotary motion around an axis of rotation (32) the distance of which from the plane of that surface of the undeformed region of the sheet that changes over into the convex surface of the bent sheet region is smaller than half the distance of this plane from the bending surface axis (24), and the distance of which from the plane of the outer surface of the bent border region (31") of the sheet is greater than double the distance of this plane from the bending surface axis (24).

13. Method according to claim 8, characterized by that the prebending element performs a translational motion during its engagement with the border region (31) of the sheet to be bent in an at least nearly parallel direction to the bent border region (31") of the sheet.

* * * * *

UNITED STATES PATENT AND TRADEMARK OFFICE
CERTIFICATE OF CORRECTION

PATENT NO. : 4,756,863

DATED : July 12, 1988

INVENTOR(S) : Georg Petershofer

It is certified that error appears in the above-identified patent and that said Letters Patent is hereby corrected as shown below:

Column 6, Claim 2, line 46, "claim 7" should read -- claim 1 --.

Signed and Sealed this

Third Day of January, 1989

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,756,863

DATED : July 12, 1988

INVENTOR(S) : Georg Petershofer

It is certified that error appears in the above-identified patent and that said Letters Patent is hereby corrected as shown below:

On the Title Page, Item [73], "Isovolta Osterreichische Isolierstoffwerke" should read --Isovolta Oesterreichische Isolierstoffwerke AG--.

Signed and Sealed this

Sixteenth Day of May, 1989

Attest:

DONALD J. QUIGG

Attesting Officer

Commissioner of Patents and Trademarks